(12) United States Patent
Kanzaki et al.

(10) Patent No.: US 9,189,469 B2
(45) Date of Patent: Nov. 17, 2015

(54) APPARATUS AND METHOD FOR SUPPORTING CREATION OF AN ELECTRONIC DOCUMENT

(75) Inventors: Eisuke Kanzaki, Kanagawa-ken (JP); Hidenobu Beppu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 12/138,367

(22) Filed: Jun. 12, 2008

(65) Prior Publication Data

US 2009/0094508 A1   Apr. 9, 2009

(30) Foreign Application Priority Data

Oct. 9, 2007   (JP) .................................. 2007-263739

(51) Int. Cl.
*G06F 17/00*   (2006.01)
*G06F 17/24*   (2006.01)

(52) U.S. Cl.
CPC .................................... *G06F 17/248* (2013.01)

(58) Field of Classification Search
CPC .............. G06F 17/2264; G06F 17/218; G06F 17/30896; G06F 17/246; G06F 17/211; G06F 17/248
USPC .......................... 715/249, 236, 205, 234, 255
See application file for complete search history.

(56) References Cited

U.S. PATENT DOCUMENTS

| | | | | |
|---|---|---|---|---|
| 5,956,737 A | * | 9/1999 | King et al. | 715/202 |
| 6,085,201 A | * | 7/2000 | Tso | 715/205 |
| 6,519,618 B1 | * | 2/2003 | Snyder | 707/738 |
| 6,684,369 B1 | * | 1/2004 | Bernardo et al. | 715/205 |
| 6,697,825 B1 | * | 2/2004 | Underwood et al. | 715/207 |
| 7,133,908 B1 | * | 11/2006 | Pajak et al. | 709/223 |
| 7,458,021 B2 | * | 11/2008 | Balasubramanyan et al. | 715/235 |
| 7,711,211 B2 | * | 5/2010 | Snowdon et al. | 382/305 |
| 7,715,586 B2 | * | 5/2010 | Issa et al. | 382/100 |

(Continued)

FOREIGN PATENT DOCUMENTS

| | | |
|---|---|---|
| JP | 11250050 A | 9/1999 |
| JP | 2005275552 A | 10/2005 |
| JP | 2006265578 A | 10/2006 |

OTHER PUBLICATIONS

IBM Press Release, Nedw home page development software that can create pages that support podcast, http://www-06.ibm.com/jp/press/20061107001.html, Mar. 6, 2008.

*Primary Examiner* — Scott Baderman
*Assistant Examiner* — Howard Cortes
(74) *Attorney, Agent, or Firm* — Prentiss Johnson; Edell, Shapiro & Finnan, LLC

(57) ABSTRACT

Time spent for the editing operation by a user when a template part in which content is embedded is changed to a new template part is reduced. In a page editing unit, a parts information storage unit stores information on template parts, a part inserting unit retrieves a first template part from the parts information storage unit, and a display unit displays the first template part. An operation reception unit accepts an operation to change the first template part to a second template part, and, in response to the operation, a candidate generating unit displays candidates for the second template part obtained by filtering based on a change rule on the display unit. Moreover, a change processing unit embeds, in an appropriate area in the second template part, content embedded in the first template part in response to an operation to select the second template part from the candidates.

27 Claims, 14 Drawing Sheets

(56) References Cited

U.S. PATENT DOCUMENTS

| | | | |
|---|---|---|---|
| 7,743,020 B2* | 6/2010 | Kelly et al. | 707/610 |
| 7,743,334 B2* | 6/2010 | Rider | 715/762 |
| 7,747,941 B2* | 6/2010 | Campbell et al. | 715/234 |
| 7,886,221 B1* | 2/2011 | Underwood et al. | 715/234 |
| 2002/0194219 A1* | 12/2002 | Bradley et al. | 707/506 |
| 2004/0268299 A1* | 12/2004 | Lei et al. | 717/106 |
| 2005/0010868 A1* | 1/2005 | Schowtka et al. | 715/517 |
| 2005/0044485 A1* | 2/2005 | Mondry et al. | 715/502 |
| 2005/0094206 A1* | 5/2005 | Tonisson | 358/1.18 |
| 2005/0229111 A1* | 10/2005 | Makela | 715/802 |
| 2005/0268227 A1* | 12/2005 | Carlson et al. | 715/517 |
| 2006/0026508 A1* | 2/2006 | Balinsky et al. | 715/517 |
| 2006/0143556 A1* | 6/2006 | Elkady | 715/500 |
| 2006/0150088 A1* | 7/2006 | Kraft et al. | 715/517 |
| 2006/0259858 A1* | 11/2006 | Collins et al. | 715/517 |
| 2007/0192164 A1* | 8/2007 | Nong et al. | 705/10 |
| 2008/0172608 A1* | 7/2008 | Patrawala et al. | 715/255 |
| 2008/0243897 A1* | 10/2008 | Petri | 707/102 |
| 2009/0067753 A1* | 3/2009 | Hanechak | 382/298 |

\* cited by examiner

| Title 2 | 401 |

(b)

Picture Title — 411
Insert Picture — 412
Picture Caption — 413

(c)

Picture Title — 421
422a, 422b, 422c, 422d — Insert Picture
423a: Picture Title 1 / Picture Caption 1
423b: Picture Title 2 / Picture Caption 2
423c: Picture Title 3 / Picture Caption 3
423d: Picture Title 4 / Picture Caption 4

FIG. 5

(a)
```
<preset id="HPB_LPT_TBOX_02" usage="contents" type="PBOX_T1C0P0" level="1" header="no" footer="no" widthtype="free" minwidth="20" >
    <name> Title 2 </name>
    <description>A layout part for a content in which a title can be written. </description>
    <imageS>hsub02.gif</imageS>
    <imageL>hsub02L.gif</imageL>
    <html>hsub02.htm</html>
</preset>
```

(b)
```
<preset id="HPB_LPT_PBOX_106" usage="contents" type="PBOX_T1C1P1" level="3" header="no" footer="no" widthtype="free" minwidth="186" >
    <name>Picture Box with Title (Left 1 Piece) </name>
    <description>A layout part for a content in which a title, a sentence, and a picture with a width of 186 pixels can be put</description>
    <imageS>hlbox02.gif</imageS>
    <imageL>hlbox02L.gif</imageL>
    <html>hlbox02.htm</html>
</preset>
```

(c)
```
<preset id="HPB_LPT_PBOX_334" usage="contents" type="PBOX_T1C4P4" level="4" header="no" footer="no" widthtype="free" minwidth="590" >
    <name>Multiple Picture Boxes with Titles (Top 4 Pieces) </name>
    <description>A layout part for a content in which a title at the top and four sets each including a sentence at the bottom and a picture with a width of 136 pixels at the top can be put </description>
    <imageS>pbox_334.gif</imageS>
    <imageL>pbox_334L.gif</imageL>
    <html>pbox_334.htm</html>
</preset>
```

FIG. 8

```
500 ⎯ <TABLE width="100%" border="0" cellspacing="0" cellpadding="0" id="HPB_LPT_TBOX_02" class="hpb-subh02">
         <TBODY>
           <TR>
501 ⎯       <TD height="21" valign="bottom" id="HPB_LP_T0" class="hpb-subh02-cell1"> Write a title here. </TD>
           </TR>
         </TBODY>
       </TABLE>
```

FIG. 9

```
510 — <DIV id="HPB_LPT_PBOX_106" class="hpb-lay-photo1"><BR>
      <TABLE width="100%" border="0" cellpadding="0" cellspacing="0" class="hpb-subh02">
        <TBODY>
          <TR>
511 —       <TD id="HPB_LP_T0" class="hpb-subh02-cell1">Picture Title </TD>
          </TR>
        </TBODY>
      </TABLE>
      <TABLE width="100%" border="0" cellpadding="0" cellspacing="0" class="hpb-dp-tb1">
        <TBODY>
          <TR>
512 —       <TD width="186" align="left" valign="top" id="HPB_LP_P0" class="hpb-dp-tb1-cell2"><IMG src="" alt="" width="186" border="0"></TD>
513 —       <TD align="left" valign="top" id="HPB_LP_C0" class="hpb-dp-tb1-cell1"> Picture Caption </TD>
          </TR>
        </TBODY>
      </TABLE><BR>
      </DIV>
```

FIG. 10

```
520  <DIV id="HPB_LPT_PBOX_334" class="hpb-lay-photo1"><BR>
     <TABLE width="100%" border="0" cellpadding="0" cellspacing="0" class="hpb-subh02">
     <TBODY>
     <TR>
521    <TD id="HPB_LP_T0" class="hpb-subh02-cell1">Picture Title </TD>
     </TR>
     </TBODY>
     </TABLE><BR>
     <TABLE class="hpb-dp-tb50" width="100%" border="0" cellpadding="0" cellspacing="0">
     <TBODY>
     <TR>
522a   <TD valign="top" id="HPB_LP_P0" class="hpb-dp-tb5-cell2"><IMG src="" alt="" width="136"></TD>
       <TD width="12" rowspan="3" class="hpb-dp-tb5-cell4"><IMG src="" alt="" width="12" height="1"></TD>
522b   <TD valign="top" id="HPB_LP_P1" class="hpb-dp-tb5-cell2"><IMG src="" alt="" width="136"></TD>
       <TD width="12" rowspan="3" class="hpb-dp-tb5-cell4"><IMG src="" alt="" width="12" height="1"></TD>
522c   <TD valign="top" id="HPB_LP_P2" class="hpb-dp-tb5-cell2"><IMG src="" alt="" width="136"></TD>
       <TD width="12" rowspan="3" class="hpb-dp-tb5-cell4"><IMG src="" alt="" width="12" height="1"></TD>
522d   <TD valign="top" id="HPB_LP_P3" class="hpb-dp-tb5-cell2"><IMG src="" alt="" width="136"></TD>
     </TR>
     <TR>
       <TD class="hpb-dp-tb5-cell3"><IMG src="c.gif" alt="" width="1" height="7"></TD>
       <TD class="hpb-dp-tb5-cell3"><IMG src="c.gif" alt="" width="1" height="7"></TD>
       <TD class="hpb-dp-tb5-cell3"><IMG src="c.gif" alt="" width="1" height="7"></TD>
       <TD class="hpb-dp-tb5-cell3"><IMG src="c.gif" alt="" width="1" height="7"></TD>
     </TR>
     <TR>
523a   <TD align="left" valign="top" id="HPB_LP_C0" class="hpb-dp-tb5-cell1"><H6>Picture Title</H6>Picture Caption </TD>
523b   <TD align="left" valign="top" id="HPB_LP_C1" class="hpb-dp-tb5-cell1"><H6>Picture Title</H6>Picture Caption </TD>
523c   <TD align="left" valign="top" id="HPB_LP_C2" class="hpb-dp-tb5-cell1"><H6>Picture Title</H6>Picture Caption </TD>
523d   <TD align="left" valign="top" id="HPB_LP_C3" class="hpb-dp-tb5-cell1"><H6>Picture Title</H6>Picture Caption </TD>
     </TR>
     </TBODY>
     </TABLE>
     </DIV>
```

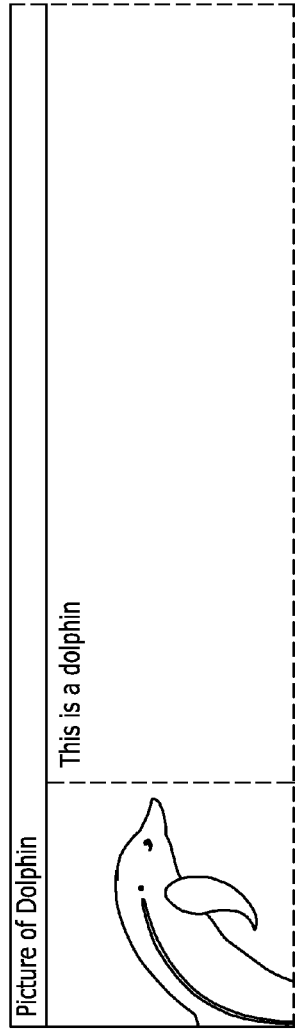

FIG. 13

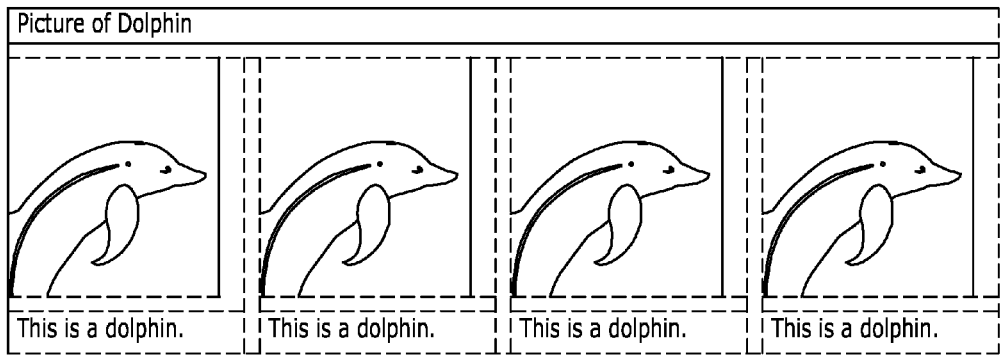

(a)

(b)

```
<DIV id="HPB_LPT_PBOX_334" class="hpb-lay-photo1"><BR>
  <TABLE width="100%"border="0" cellpadding="0" cellspacing="0" class="hpb-subh02">
    <TBODY>
      <TR>
        <TD id="HPB_LP_T0" class="hpb-subh02-cell1">Picture of Dolphin</TD>
      </TR>
    </TBODY>
  </TABLE><BR>
  <TABLE class"hpb-dp-tb50" width="100%"border="0" cellpadding="0" cellspacing="0">
    <TBODY>
      <TR>
        <TD valign="top"id="HPB_LP_P0" class="hpb-dp-tb5-cell2"><IMG src="ani0002.jpg" alt="" width="136" border="0" height="102"></TD>
        <TD width="12" rowspan="3" class="hpb-dp-tb5-cell4"><IMG src="c.gif" alt=""width="12" height="1"></TD>
        <TD valign="top"id="HPB_LP_P1" class="hpb-dp-tb5-cell2"><IMG src="ani0002.jpg" alt="" width="136" border="0" height="102"></TD>
        <TD width="12" rowspan="3" class="hpb-dp-tb5-cell4"><IMG src="c.gif" alt=""width="12" height="1"></TD>
        <TD valign="top"id="HPB_LP_P2" class="hpb-dp-tb5-cell2"><IMG src="ani0002.jpg" alt="" width="136" border="0" height="102"></TD>
        <TD width="12" rowspan="3" class="hpb-dp-tb5-cell4"><IMG src="c.gif" alt=""width="12" height="1"></TD>
        <TD valign="top"id="HPB_LP_P3" class="hpb-dp-tb5-cell2"><IMG src="ani0002.jpg" alt="" width="136" border="0" height="102"></TD>
      </TR>
      <TR>
        <TD class="hpb-dp-tb5-cell3"><IMG src="c.gif" alt=""width="1"height="7"></TD>
        <TD class="hpb-dp-tb5-cell3"><IMG src="c.gif" alt=""width="1"height="7"></TD>
        <TD class="hpb-dp-tb5-cell3"><IMG src="c.gif" alt=""width="1"height="7"></TD>
        <TD class="hpb-dp-tb5-cell3"><IMG src="c.gif" alt=""width="1"height="7"></TD>
      </TR>
      <TR>
        <TD align="left" valign="top" id="HPB_LP_C0" class="hpb-dp-tb5-cell1">This is a dolphin. </TD>
        <TD align="left" valign="top" id="HPB_LP_C1" class="hpb-dp-tb5-cell1">This is a dolphin. </TD>
        <TD align="left" valign="top" id="HPB_LP_C2" class="hpb-dp-tb5-cell1">This is a dolphin. </TD>
        <TD align="left" valign="top" id="HPB_LP_C3" class="hpb-dp-tb5-cell1">This is a dolphin. </TD>
      </TR>
    </TBODY>
  </TABLE>
</DIV>
```

APPARATUS AND METHOD FOR SUPPORTING CREATION OF AN ELECTRONIC DOCUMENT

RELATED APPLICATION

This application claims the benefit of and priority to Japanese Application Number 2007-263739, filed Oct. 9, 2007, the contents of which are incorporated by reference herein in its entirety.

BACKGROUND

1. Field

This disclosure generally relates apparatuses and methods used to create electronic documents. More particularly, the disclosure relates to an apparatus and a method for supporting creation of electronic documents.

2. General Background

Presently, a large number of Web sites exist on the Internet. Many Web pages that constitute these Web sites are colorful and elaborately designed. In a case where such elaborate Web pages are created, when, for example, an editor is used, a huge number of person-hours are required.

Thus, hitherto, various types of Web page development support tool have been provided so as to enable efficient creation of Web pages. After a layout is created using a template part and content is embedded in the template part, the template part may need to be changed, for example, when it is found that the number of pieces of content to embedded becomes larger or smaller than initially expected.

Conventionally, when a template part needs to be changed, the editing operation needs to be restarted from the start or the user needs to edit the template part. For example, a dialog for individually editing areas that constitute a template part has been provided as a technique for supporting such editing operation by the user. Moreover, a technique for performing transformation of an entire page so as to move the content has been provided.

When a template part can be changed without the need for such editing operation by the user, the usability of products can be further improved.

In, for example, Contents Management System ("CMS"), since content and display layouts are separately managed, the appearance is changed by statically or dynamically changing a corresponding display layout. Thus, as the number of pieces of content to be embedded increases, the display layout also needs to be changed.

While problems with creation of Web pages have been described, similar problems can be indicated for general electronic documents.

SUMMARY

In one aspect of the disclosure, an apparatus is provided. The apparatus includes a storage unit that stores a plurality of electronic templates such that each electronic template includes contents areas in which content elements that constitute an electronic document are to be embedded to create the electronic document. Further, the apparatus includes a first control unit that controls a display unit that displays a first electronic template selected from the plurality of electronic templates stored in the storage unit. In addition, the apparatus includes a reception unit that accepts an operation to change the first electronic template including contents areas in which specific content elements are embedded to a second electronic template from the plurality of electronic templates. The apparatus also includes a determining unit that, in response to the operation accepted by the reception unit, determines a state of embedding of the specific content elements in the second electronic template on the basis of attributes of the contents areas in the first electronic template and contents areas in the second electronic template. Finally, the apparatus includes a second control unit that controls the display unit to display the second electronic template on the basis of the state of embedding determined by the determining unit.

In another aspect of the disclosure, a process is provided. The process displays a first electronic template selected from a plurality of electronic templates that each include contents areas in which content elements that constitute an electronic document are to be embedded to create the electronic document. Further, the process accepts an operation to change the first electronic template including contents areas in which specific content elements are embedded to a second electronic template out of the plurality of electronic templates. In addition, the process determines, in response to the operation, a state of embedding of the specific content elements in the second electronic template on the basis of attributes of the contents areas in the first electronic template and contents areas in the second electronic template. Finally, the process displays the second electronic template on the basis of the determined state of embedding.

In yet another aspect of the disclosure, a computer program product comprises a computer useable medium. The computer useable medium has a computer readable program such that when the computer readable medium is executed on a computer, the computer is caused to display a first electronic template selected from a plurality of electronic templates that each include contents areas in which content elements that constitute an electronic document are to be embedded to create the electronic document. Further, the computer is caused to accept an operation to change the first electronic template including contents areas in which specific content elements are embedded to a second electronic template out of the plurality of electronic templates. In addition, the computer is cause to determine, in response to the operation, a state of embedding of the specific content elements in the second electronic template on the basis of attributes of the contents areas in the first electronic template and contents areas in the second electronic template. Finally, the computer is caused to display the second electronic template on the basis of the determined state of embedding.

DRAWINGS

The above-mentioned features of the present disclosure will become more apparent with reference to the following description taken in conjunction with the accompanying drawings wherein like reference numerals denote like elements and in which:

FIG. 2 shows specific examples of template parts used in the embodiment of the disclosure.

FIG. 5 shows specific examples of management information of template parts referred to in the embodiment of the disclosure.

FIG. 8 shows a specific example of definition information of a template part before content is embedded, the template part being referred to in the embodiment of the disclosure.

FIG. 9 shows a specific example of definition information of a template part before content is embedded, the template part being referred to in the embodiment of the disclosure.

FIG. 10 shows a specific example of definition information of a template part before content is embedded, the template part being referred to in the embodiment of the disclosure.

FIG. 11 shows an example of definition information of a template part after content is embedded, the template part being referred to in the embodiment of the disclosure.

FIG. 13 shows an example of a template part obtained when a copy mode is specified and an example of definition information of the template part in the embodiment of the present invention.

DETAILED DESCRIPTION

Figure 1:
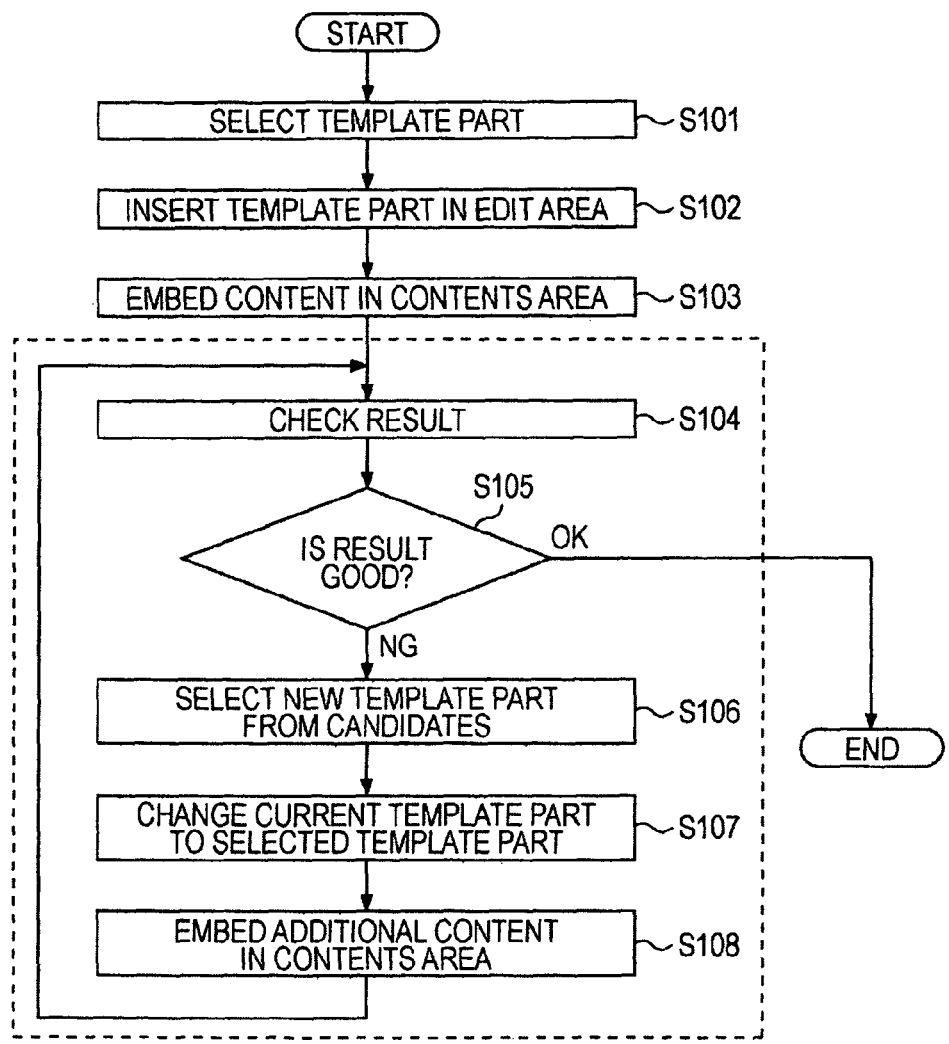
FIG. 1 is a flowchart showing the flow of an editing operation by a user in an embodiment of the disclosure.

An apparatus and method supports creation of electronic documents. The operability at the time of changing a template part is improved. When an electronic template in which content is embedded is changed to a new electronic template, the state of embedding of content in the new electronic template is automatically determined. Specifically, an apparatus for supports creation of an electronic document. The apparatus includes a storage unit that stores a plurality of electronic templates each including Contents Areas in which content elements that constitute the electronic document are to be embedded to create the electronic document, a first control unit that controls a display unit so as to display a first electronic template selected from the plurality of electronic templates stored in the storage unit, a reception unit that accepts an operation to change the first electronic template including Contents Areas in which specific content elements are embedded to a second electronic template out of the plurality of electronic templates, a determining unit that, in response to the operation accepted by the reception unit, determines a state of embedding of the specific content elements in the second electronic template on the basis of attributes of the Contents Areas in the first electronic template and Contents Areas in the second electronic template, and a second control unit that controls the display unit so as to display the second electronic template on the basis of the state of embedding determined by the determining unit.

A mechanism for growth and degeneration is introduced in electronic templates to prepare for possible increase and decrease in the number of pieces of content embedded in an initially selected electronic template in the future.

In a case where an electronic template is changed with an option of growth, the following apparatus may be provided.

Specifically, in this apparatus, the second electronic template may include more Contents Areas having a specific attribute than the first electronic template, and the determining unit may determine Contents Areas in the second electronic template, the specific content elements being to be embedded in the Contents Areas, on the basis of the state of embedding.

Moreover, the apparatus may further include an extracting unit that extracts, as candidates for the second electronic template, electronic templates that meet a condition that the electronic templates include more Contents Areas having the specific attribute than the first electronic template, and a third control unit that controls the display unit so as to display the candidates for the second electronic template extracted by the extracting unit.

Moreover, the extracting unit may extract, as candidates for the second electronic template, electronic templates that further meet a condition related to at least one of a state of embedding of the specific content elements in the first electronic template and a state of display of the first electronic template by the display unit.

Moreover, the second control unit may control the display unit so as to display the second electronic template in a state in which new content elements obtained by performing transformation of the specific content elements so as to fit into Contents Areas determined by the determining unit are embedded in the Contents Areas.

Moreover, the second control unit may control the display unit so as to display the second electronic template in a state in which one of the specific content elements embedded in a Contents Area in the first electronic template is embedded in a plurality of Contents Areas determined by the determining unit.

In a case where an electronic template is changed with an option of degeneration, the following apparatus may be provided.

Specifically, in this apparatus, the second electronic template may include fewer Contents Areas having a specific attribute than the first electronic template, and the determining unit may determine whether to embed the specific content elements in the second electronic template on the basis of the state of embedding.

Moreover, the apparatus may further include an extracting unit that extracts, as candidates for the second electronic template, electronic templates that meet a condition that the electronic templates include fewer Contents Areas having the specific attribute than the first electronic template, and a third control unit that controls the display unit so as to display the candidates for the second electronic template extracted by the extracting unit.

Moreover, the second control unit may control the display unit so as to display the second electronic template in a state in which the specific content elements are embedded in areas in the second electronic template that are not displayed.

Moreover, a method is provided for supporting creation of an electronic document. The method includes a step of displaying a first electronic template selected from a plurality of electronic templates each including Contents Areas in which content elements that constitute the electronic document are to be embedded to create the electronic document, a step of accepting an operation to change the first electronic template including Contents Areas in which specific content elements are embedded to a second electronic template out of the plurality of electronic templates, a step of, in response to the operation, determining a state of embedding of the specific content elements in the second electronic template on the basis of attributes of the Contents Areas in the first electronic template and Contents Areas in the second electronic template, and a step of displaying the second electronic template on the basis of the determined state of embedding.

Moreover, a program is provided for causing a computer to function as an apparatus for supporting creation of an electronic document. The program causes the computer to function as a first control unit that controls a display unit so as to display a first electronic template selected from a plurality of electronic templates each including Contents Areas in which content elements that constitute the electronic document are to be embedded to create the electronic document, a reception unit that accepts an operation to change the first electronic template including Contents Areas in which specific content elements are embedded to a second electronic template out of the plurality of electronic templates, a determining unit that, in response to the operation accepted by the reception unit, determines a state of embedding of the specific content elements in the second electronic template on the basis of attributes of the Contents Areas in the first electronic template and Contents Areas in the second electronic template, and a second control unit that controls the display unit so as to display the second electronic template on the basis of the state of embedding determined by the determining unit.

When a template part in which content is embedded is changed to a new template part, time spent for the editing operation by a user is reduced.

The disclosure assumes editing of Web pages. Editing of general electronic documents can also be considered in the same manner.

A flow in the present embodiment in which a user edits a Web page (hereinafter simply called a page) will be described first.

FIG. 1 is a flowchart showing the flow of a page editing operation in which a page editing unit is used.

The user first selects a desired template part from various types of electronic template (template part) provided by the page editing unit (step 101). Then, the template part is inserted in an edit area on a display screen in the page editing unit (step 102).

Then, the user performs an operation to embed content in an area (hereinafter called a Contents Area) in which content in the template part is to be embedded (step 103). Then, the user checks the appearance of the page (step 104) to determine whether any problem exists (step 105).

As a result, when no problem exists, the operation is finished. When a problem exists, the operation is continued using another template part.

Specifically, the page editing unit presents candidates for a template part, and the user selects a desired template part from the candidates (step 106). Then, the user performs an operation to change the template part, which has been selected earlier and is currently being displayed, to the newly selected template part (step 107). Then, for example, when content is added, the additional content is embedded in the Contents Area increased by changing the template part to the new template part (step 108).

Then, the process again returns to step 104, and the user checks the appearance of the page. Subsequently, a similar operation is repeated until the appearance of the page is satisfactory.

Specific examples of template parts selected in steps 101 and 106 will now be described.

FIG. 2 shows specific examples of template parts.

Part (a) shows a template part that includes only a Contents Area 401 in which a title is to be embedded.

Part (b) shows a template part that includes a Contents Area 411 in which a title is to be embedded, a Contents Area 412 in which a picture is to be embedded on the left side under the Contents Area 411, and a Contents Area 413 in which a caption is to be embedded on the right side under the Contents Area 411.

Part (c) shows a template part that includes a Contents Area 421 in which a title is to be embedded, Contents Areas 422a, 422b, 422c, and 422d in which pictures are to be embedded under the Contents Area 421, and Contents Areas 423a, 423b, 423c, and 423d in which captions are to be embedded below the Contents Area 421.

Hereinafter, a Contents Area in which a title is to be embedded is called a title area, a Contents Area in which a caption is to be embedded is called a caption area, and a Contents Area in which a picture is to be embedded is called a picture area. In the specification, these three types of Contents Area are supposed to be Contents Areas to be included in a template part. Other Contents Areas, for example, a link area, a header area, and a footer area, may also be included in a template part.

In the page editing unit according to the present embodiment, a plurality of template parts that include different types or numbers of Contents Areas are provided in this manner. In the present embodiment, rules (change rules) for changing a template part that is currently being used to a new template part are classified as described below.

Figure 3:
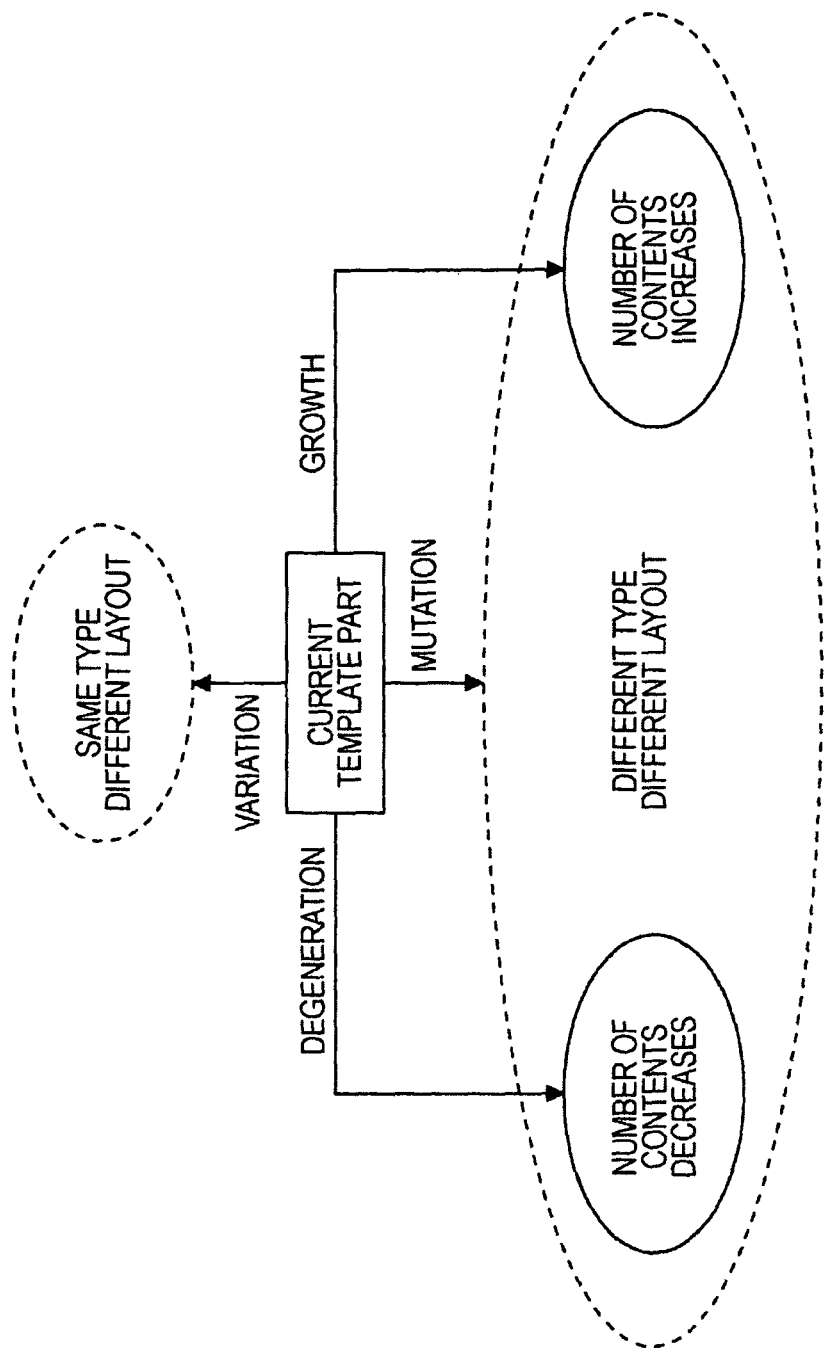
FIG. 3 is a schematic diagram showing rules for changing a template part in the embodiment of the disclosure.

FIG. 3 is a schematic diagram showing such change rules.

Changing the current template part to a new template part can first be divided into "mutation" and "variation". "Mutation" and "variation" are the same in that the current template part is changed to a template part the layout of which is different from that of the current template part, but different in the following points:

"Mutation" means changing the current template part to a template part the type of which is different from that of the current template part.

"Variation" means changing the current template part to a template part the type of which is the same as that of the current template part.

The "type" of a template part represents attribute information showing each number of title areas, caption areas, and picture areas included in the template part.

Specifically, for example, changing the template part in FIG. 2(a) to the template part in FIG. 2(b) corresponds to "mutation" because the numbers of caption areas and picture areas are different. Moreover, for example, changing the template part in FIG. 2(b) to the template part in FIG. 2(c) also corresponds to "mutation" in the same way.

On the other hand, when it is assumed that, as opposed to the template part in FIG. 2(b), another template part in which, for example, the caption area and the picture area are interchanged exists, the change between these template parts corresponds to "variation" because, although the layouts are different, the numbers of Contents Areas of each type are not different.

Moreover, in the present embodiment, "mutation" is further divided into "growth" and "degeneration". While "mutation" is a rule in which only difference in the numbers of Contents Areas of each type included in a template part is considered, "growth" and "degeneration" are rules in which increase and decrease in the number of Contents Areas of each type included in a template part are considered, and can be defined as follows:

"Growth" means changing the current template part to a template part the number of Contents Areas is larger than that of the current template part.

"Degeneration" means changing the current template part to a template part the number of Contents Areas is smaller than that of the current template part.

For example, changing the template part in FIG. 2(a) to the template part in FIG. 2(b) corresponds to "growth" because the number of caption areas is increased from zero to one, and the number of picture areas is increased from zero to one. Moreover, changing the template part in FIG. 2(b) to the template part in FIG. 2(c) corresponds to "growth" because the number of caption areas is increased from one to four, and the number of picture areas is increased from one to four.

On the other hand, changing the template part in FIG. 2(c) to the template part in FIG. 2(b) corresponds to "degeneration" because the number of caption areas is decreased from four to one, and the number of picture areas is decreased from four to one. Moreover, changing the template part in FIG. 2(b) to the template part in FIG. 2(a) corresponds to "degeneration" because the number of caption areas is decreased from one to zero, and the number of picture areas is decreased from one to zero.

A page editing unit for editing pages by repeatedly changing a template part to a desired template part with options of growth, degeneration, variation, and mutation will now be described.

Figure 4:
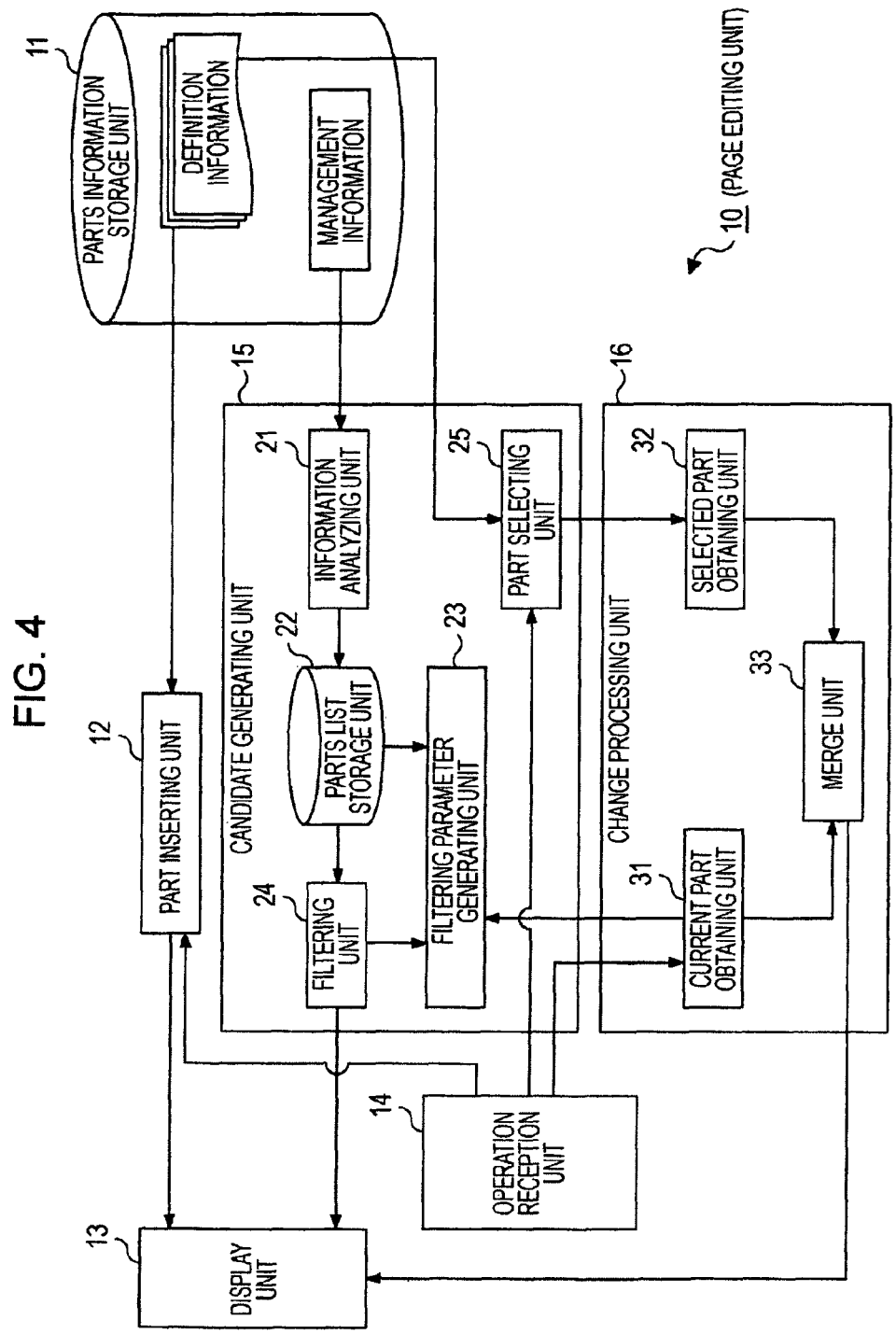
FIG. 4 is a block diagram showing an example of the functional structure of a page editing unit according to the embodiment of the disclosure.

FIG. 4 shows an example of the functional structure of a page editing unit 10 according to the present embodiment.

The page editing unit 10 includes a parts information storage unit 11, a part inserting unit 12, a display unit 13, an operation reception unit 14, a candidate generating unit 15, and a change processing unit 16, as shown in the drawing. The candidate generating unit 15 includes an information analyzing unit 21, a Parts List storage unit 22, a filtering parameter generating unit 23, a filtering unit 24, and a part selecting unit 25. The change processing unit 16 includes a current part obtaining unit 31, a selected part obtaining unit 32, and a merge unit 33.

The parts information storage unit 11 stores the definition information of template parts (hereinafter simply called "definition information") and the management information of template parts (hereinafter simply called "management information"). Definition information is description that defines, for example, the layout of a template part. Since a template part is displayed using a Web browser, the definition information is stored as a HyperText Markup Language (HTML) document. Management information is information for managing attribute information such as the type of each template part. Management information can be prepared in any format and is prepared in the extensible Markup Language (XML) format in this case. In the present embodiment, the parts information storage unit 11 is provided as an example of a storage unit that stores a plurality of electronic templates.

The part inserting unit 12 inserts a template part in the edit area on the display unit 13 in response to a user operation. In the present embodiment, the part inserting unit 12 is provided as an example of a first control unit that controls the display unit so as to display a first electronic template.

The display unit 13 displays a template part that is designated to be inserted in the edit area, candidates for a template part to be selected next, a new template part selected from the candidates, and the like.

The operation reception unit 14 accepts an operation to select a template part to be inserted in the edit area, an operation to change the template part to another template part, and the like.

The candidate generating unit 15 generates candidates for a template part to be selected so as to efficiently perform an operation to select another template part in response to a request to change a template part (hereinafter called a "current part") that is currently being displayed. The detailed functional structure of the candidate generating unit 15 will be described below. In the present embodiment, the candidate generating unit 15 is provided as an example of an extracting unit that extracts candidates for a second electronic template and an example of a third control unit that controls the display unit so as to display the candidates for the second electronic template.

When a user selects a desired template part from candidates for a template part, the change processing unit 16 changes the current part to the template part (hereinafter called a "selected part"), which is selected. The detailed functional structure of the change processing unit 16 will be described below.

The functions of the candidate generating unit 15 will now be described.

The information analyzing unit 21 reads management information from the parts information storage unit 11 and analyzes the management information. In the present embodiment, the management information is managed in the XML format. Thus, attribute information in the management information is retrieved so that the information analyzing unit 21 can readily perform filtering using the attribute information.

The Parts List storage unit 22 stores a Parts List that includes the attribute information, which is retrieved from the management information by the information analyzing unit 21. In the Parts List, for all template parts, pieces of information of correspondences between part IDs for uniquely identifying the parts and pieces of attribute information of the parts are listed.

The filtering parameter generating unit 23 generates filtering parameters for filtering the Parts List stored in the Parts List storage unit 22. In this case, the filtering parameters are generated on the basis of information transferred from the current part obtaining unit 31, such as the part ID of the current part, and a predetermined criterion for filtering.

The filtering unit 24 filters the Parts List stored in the Parts List storage unit 22 using the filtering parameters generated by the filtering parameter generating unit 23 and outputs the result to the display unit 13.

The part selecting unit 25 obtains the part ID of a selected part from the operation reception unit 14, selects part information on the part from the parts information storage unit 11 using the part ID as a key, and then transfers the part information to the selected part obtaining unit 32.

The functions of the change processing unit 16 will now be described.

The current part obtaining unit 31 obtains information on the current part in response to an operation to change the current part to a selected part. In this case, the information on the current part is obtained as, for example, an HTML document that is held to embed content in the current part and display the current part. The information on the current part includes, for example, a part ID for uniquely identifying the current part and the information of content embedded in Contents Areas of the current part.

The selected part obtaining unit 32 obtains information on a selected part from the part selecting unit 25 in response to an operation to specify the selected part. In this case, for example, management information and definition information on the selected part are obtained as the information on the selected part.

The merge unit 33 embeds, in the selected part, content embedded in the current part. In this case, the content embedded in the current part is transformed so as to fit into the selected part, as necessary. In the present embodiment, the merge unit 33 is provided as an example of a determining unit that determines the state of embedding of content elements and an example of a second control unit that controls the display unit so as to display the second electronic template.

The operation of the page editing unit 10 in the present embodiment will now be described in detail.

The operation of the candidate generating unit 15 generating candidates for a template part will first be described.

In this case, the candidate generating unit 15 refers to management information stored in the parts information storage unit 11. Thus, before the operation is described, management information will be described specifically.

FIG. 5 shows examples of such management information.

Parts (a), (b), and (c) of FIG. 5 show respective examples of management information for managing the template parts in Parts (a), (b), and (c) of FIG. 2.

The management information in Part (a) will first be described.

In the management information, "HPB_LPT_TBOX_02" is defined as the part "ID" of the template part in FIG. 2(a) in the id attribute of a "preset" element.

Moreover, "PBOX_T1C0P0" is defined as the type of the template part in FIG. 2(a) in the type attribute of the "preset" element. In the description of the type, a character string following "_" indicates the number of Contents Areas of each type. Specifically, a number following "T" indicates the number of title areas, a number following "C" indicates the number of caption areas, and a number following "P" indicates the number of picture areas. In this case, "T1C0P0" indicates that the number of title areas is one, and the number of caption areas and the number of picture areas are zero.

Moreover, "1" is defined as the "level" of the template part in FIG. 2(a) in the level attribute of the "preset" element. The level is an attribute that is defined to determine which of growth and degeneration is to be applied to the template part. In the present embodiment, since it can be determined, by comparing the numbers of Contents Areas of each type in the type, which of growth and degeneration is to be applied to the template part, it is determined, mainly on the basis of the type, which of growth and degeneration is to be applied. However, the level is also defined to simplify such determination.

Moreover, "20" is defined as the minimum width of the template part in FIG. 2(a) in the "minwidth" attribute of the "preset" element. This attribute is an exemplary attribute for the purpose of not breaking the layout after the template part is changed.

The management information in Part (b) will now be described.

In the management information, "HPB_LPT_PBOX_106" is defined as the part ID of the template part in FIG. 2(b) in the "id" attribute of the "preset" element.

Moreover, "PBOX_T1C1P1" is defined as the type of the template part in FIG. 2(b) in the type attribute of the "preset" element. In this case, a character string following "_" is "T1C1P1". This indicates that the number of title areas, the number of caption areas, and the number of picture areas are one.

Moreover, "3" is defined as the level of the template part in FIG. 2(b) in the "level" attribute of the "preset" element.

Moreover, "186" is defined as the minimum width of the template part in FIG. 2(b) in the "minwidth" attribute of the "preset" element.

The management information in Part (c) will now be described.

In the management information, "HPB_LPT_PBOX_334" is defined as the part ID of the template part in FIG. 2(c) in the "id" attribute of the "preset" element.

Moreover, "PBOX_T1C4P4" is defined as the type of the template part in FIG. 2(c) in the "type" attribute of the "preset" element. In this case, a character string following "_" is "T1C4P4". This indicates that the number of title areas is one, and the number of caption areas and the number of picture areas are four.

Moreover, "4" is defined as the level of the template part in FIG. 2(c) in the "level" attribute of the "preset" element.

Moreover, "590" is defined as the minimum width of the template part in FIG. 2(c) in the "minwidth" attribute of the "preset" element.

Assuming that such management information is stored in the parts information storage unit 11, the candidate generating unit 15 operates as described below.

Figure 6:
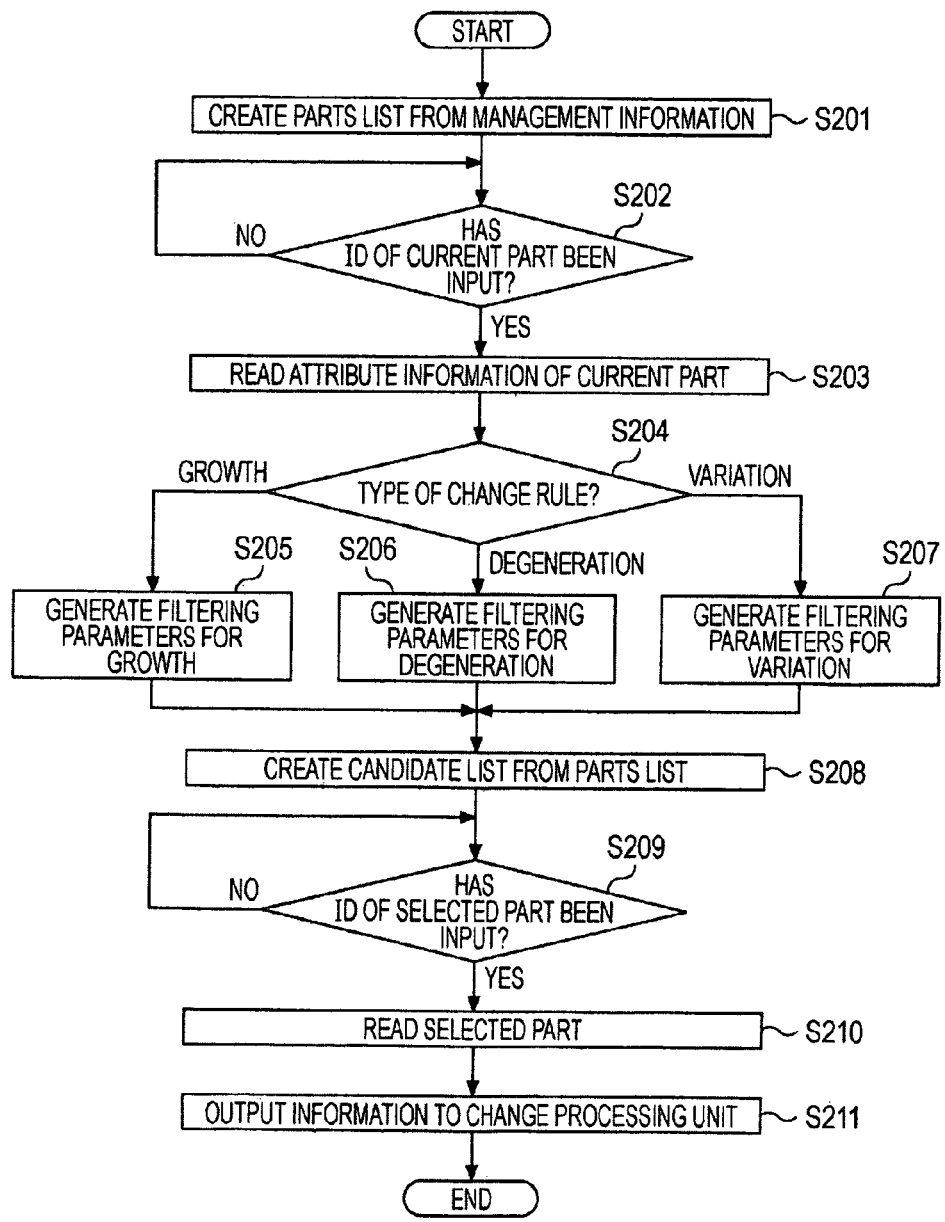
FIG. 6 is a flowchart showing an exemplary operation of a candidate generating unit in the page editing unit according to the embodiment of the disclosure.

FIG. 6 is a flowchart showing an exemplary operation of the candidate generating unit 15.

In the candidate generating unit 15, the information analyzing unit 21 first analyzes the management information stored in the parts information storage unit 11, and then a Parts List is created and stored in the Parts List storage unit 22 (step 201). In this case, the information analyzing unit 21 extracts a part ID from the "id" attribute of the "preset" element in the management information in FIG. 5. The information analyzing unit 21 further extracts the number of Contents Areas of each type, i.e., a title area, a caption area, and a picture area, from a character string following "_" in the "type" attribute of the "preset" element. The information analyzing unit 21 further extracts a level from the "level" attribute of the "preset" element, and a minimum width from the "minwidth" attribute of the "preset" element. Then, a Parts List is created by relating the part ID to these pieces of attribute information.

Then, in the candidate generating unit 15, it is determined whether the filtering parameter generating unit 23 has received the part ID of the current part from the current part obtaining unit 31 (step 202). In other words, it is determined whether the user has performed an operation to change the current part to another template part.

When the filtering parameter generating unit 23 has not received the part ID from the current part obtaining unit 31, the filtering parameter generating unit 23 repeats step 202 to wait for input of a part ID.

On the other hand, when the filtering parameter generating unit 23 has received the part ID from the current part obtaining unit 31, the filtering parameter generating unit 23 reads the attribute information of the current part from the Parts List stored in the Parts List storage unit 22, using the part ID as a key (step 203). Then, it is determined what is set as the criterion for filtering (step 204). It is preferable that, for example, the user be caused to specify the criterion for filtering in a dialog box for changing the current part to another template part, and the information be stored in a memory that can be referred to by the filtering parameter generating unit 23.

In this case, it is assumed that one of growth, degeneration, and variation is set as the criterion for filtering.

A case where growth is set as the criterion for filtering will first be described.

In this case, the filtering parameter generating unit 23 generates filtering parameters for extracting template parts, changing the current part to the template parts corresponding to growth (step 205). For example, assuming that the numbers of title areas, caption areas, and picture areas in the current part are respectively CurT, CurC, and CurP, and parameters that represent the numbers of title areas, caption areas, and picture areas are respectively T, C, and P, the filtering parameters are expressed as: (T≥CurT and C≥CurC and P≥CurP) and not (T=CurT and C=CurC and P=CurP).

A case where degeneration is set as the criterion for filtering will now be described.

In this case, the filtering parameter generating unit 23 generates filtering parameters for extracting template parts, changing the current part to the template parts corresponding to degeneration (step 206). For example, assuming that the numbers of title areas, caption areas, and picture areas in the current part are respectively CurT, CurC, and CurP, and parameters that represent the numbers of title areas, caption areas, and picture areas are respectively T, C, and P, the filtering parameters are expressed as: (T≤CurT and C≤CurC and P≤CurP) and not (T=CurT and C=CurC and P=CurP).

A case where variation is set as the criterion for filtering will now be described.

In this case, the filtering parameter generating unit 23 generates filtering parameters for extracting template parts, changing the current part to the template parts corresponding to variation (step 207). For example, assuming that the part ID of the current part and the numbers of title areas, caption areas, and picture areas in the current part are respectively CurID, CurT, CurC, and CurP, and parameters that represent the part ID, the numbers of title areas, caption areas, and picture areas are respectively ID, T, C, and P, the filtering parameters are expressed as: T=CurT and C=CurC and P=CurP and ID≠CurID.

When one of growth and degeneration is set as the criterion for filtering, the filtering parameters may be generated on the basis of a level extracted from the management information, as described above. In this case, assuming that the level of the current part is CurL, and a parameter that represents a level is L, L>CurL is filtering parameters for growth, and L<CurL is filtering parameters for degeneration.

Moreover, regardless of change rules growth and degeneration, the part ID may be classified into a category, and filtering parameters for extracting template parts in the same category may be generated.

Moreover, in addition to growth, degeneration, and variation, for example, a criterion regarding the image size or a criterion regarding the width of an area at which the current part is placed may be set as an additional criterion for filtering.

A case where a criterion regarding the image size is set will first be described.

In this case, it is assumed that the current part obtaining unit 31 transfers the information of the size of an image embedded in the current part to the filtering parameter generating unit 23 in addition to the part ID. The filtering parameter generating unit 23 generates filtering parameters that represent the relationship with information (not shown in FIG. 5) of the image size extracted from the management information. In this case, a criterion regarding the image size has been described as an example but is just an exemplary criterion regarding the state of embedding of content in a template part. Alternatively, another criterion may be adopted as such a criterion.

A case where a criterion regarding the width of an area is set will now be described.

In this case, it is assumed that the current part obtaining unit 31 transfers the information of the width of an area in which the current part is inserted to the filtering parameter generating unit 23 in addition to the part ID. The filtering parameter generating unit 23 obtains, from the Parts List storage unit 22, information extracted from the "minwidth" attribute of the "preset" element in the management information and generates, on the basis of the information, filtering parameters that represent the relationship between the width of an edit area in which the current part is inserted and the width defined in the management information. In this case, a criterion regarding the width of an area has been described as an example but is just an exemplary criterion regarding the state of display of a template part. Alternatively, another criterion may be adopted as such a criterion.

The filtering parameter generating unit 23 transfers the filtering parameters generated in this manner to the filtering unit 24. Then, the filtering unit 24 generates a list of template parts to be presented as candidates by filtering the Parts List stored in the Parts List storage unit 22 and outputs the candidate list to the display unit 13 (step 208).

Figure 7:
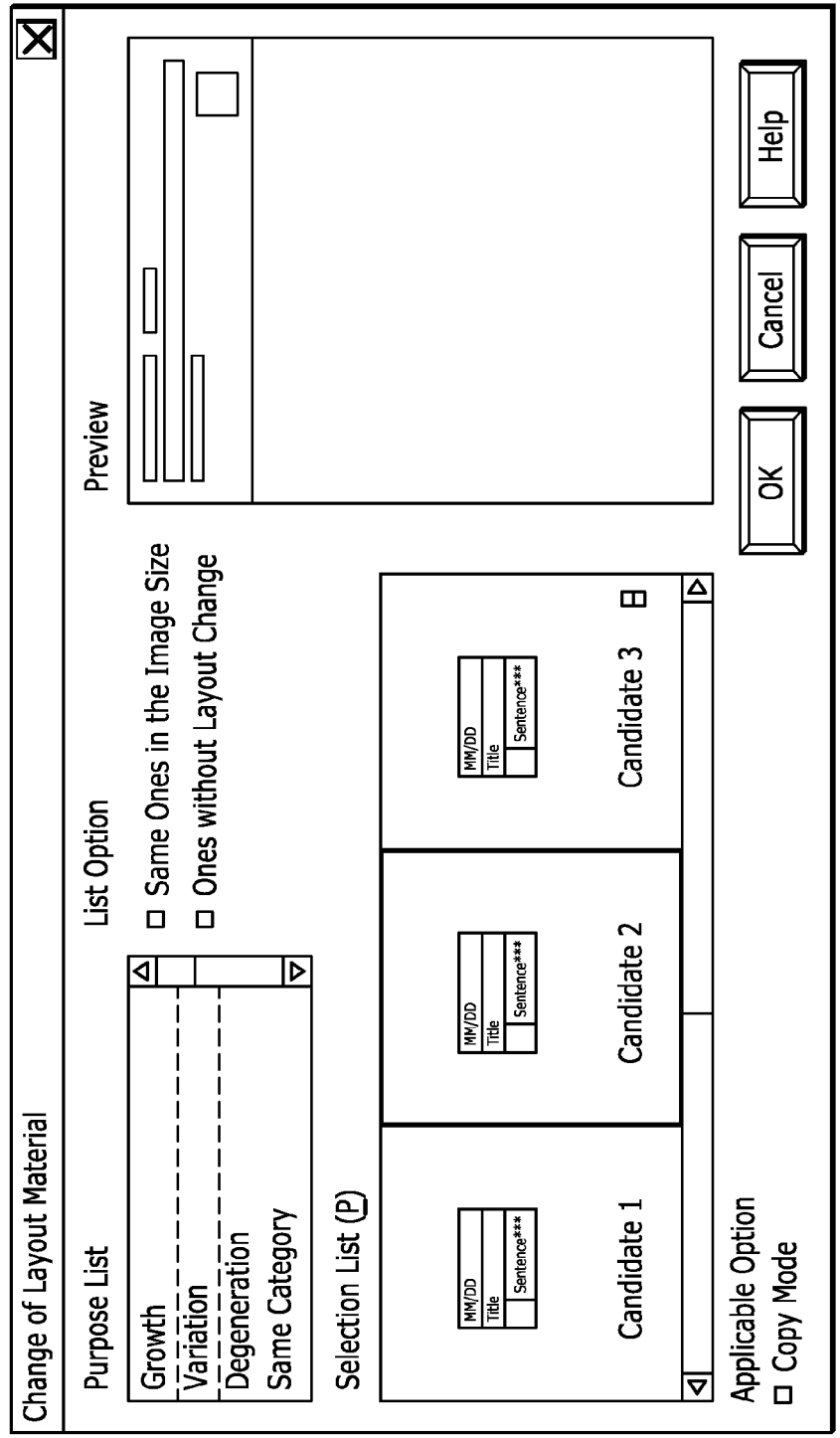
FIG. 7 shows an exemplary selection screen displayed in the embodiment of the disclosure.

FIG. 7 shows an exemplary selection screen on which the candidate list is output so that a template part can be selected.

In this case, change rules such as "growth", "variation", and "degeneration" are displayed in a "purpose list" field. When the user has selected a desired change rule from these change rules, template parts corresponding to the selected change rule are displayed in a "selection list" field below the "purpose list" field. Then, the user selects a desired template part from the template parts displayed in the selection list field and confirms the selection by pressing an "OK" button.

On the other hand, in the page editing unit 10, the operation reception unit 14 waits for such selection by the user.

Returning to FIG. 6, the operation in a case where the user has selected a template part will now be described. When the user has selected a template part, the operation reception unit 14 determines the part ID of the selected part and outputs the part ID to the part selecting unit 25. Thus, the candidate generating unit 15 determines whether the part selecting unit 25 has received the part ID of the selected part (step 209).

When the part selecting unit 25 has not received the part ID of the selected part, the part selecting unit 25 repeats step 209 to wait for input of a part ID.

On the other hand, when the part selecting unit 25 has received the part ID of the selected part, the part selecting unit 25 reads the part information of the selected part from the parts information storage unit 11, using the part ID as a key (step 210). Then, the part selecting unit 25 outputs the read part information to the selected part obtaining unit 32 (step 211).

The operation of the change processing unit 16 embedding, in the selected part, content embedded in the current part will now be described.

In this case, the change processing unit 16 refers to definition information stored in the parts information storage unit 11. Thus, before the operation is described, definition information will be described specifically.

FIGS. 8 to 10 show examples of such definition information.

FIGS. 8, 9, and 10 show respective examples of definition information for displaying the template parts in Parts (*a*), (*b*), and (*c*) of FIG. 2.

The definition information in FIG. 8 will first be described.

In the definition information, "HPB_LPT_TBOX_02" is defined as the part ID of the template part in FIG. 2(*a*) in the "id" attribute of a "TABLE" element 500.

Moreover, "HPB_LP_T0" is defined as an area ID for uniquely identifying the Contents Area 401 included in the template part in FIG. 2(*a*) in the "id" attribute of a "TD" element 501. In the description of the area ID, a character string following the second "_" indicates the type and number of each Contents Area. Specifically, "T" indicates a title area, and a number following "T" indicates the number of the title area. In this case, "T0" indicates that number 0 is assigned to a title area.

The definition information in FIG. 9 will now be described.

In the definition information, "HPB_LPT_PBOX__106" is defined as the part ID of the template part in FIG. 2(b) in the "id" attribute of a "DIV" element 510.

Moreover, "HPB_LP_T0" is defined as an area ID for uniquely identifying the Contents Area 411 included in the template part in FIG. 2(b) in the "id" attribute of a "TD" element 511. In this case, a character string following the second "_" is "T0". This indicates that number 0 is assigned to a title area.

Moreover, "HPB_LP_P0" is defined as an area ID for uniquely identifying the Contents Area 412 included in the template part in FIG. 2(b) in the id attribute of a TD element 512. In this case, a character string following the second "_" is "P0". This indicates that number 0 is assigned to a picture area.

Moreover, "HPB_LP_C0" is defined as an area ID for uniquely identifying the Contents Area 413 included in the template part in FIG. 2(b) in the "id" attribute of a "TD" element 513. In this case, a character string following the second "_" is "C0". This indicates that number 0 is assigned to a caption area.

The definition information in FIG. 10 will now be described.

In the definition information, "HPB_LPT_PBOX__334" is defined as the part ID of the template part in FIG. 2(c) in the "id" attribute of a "DIV" element 520.

Moreover, "HPB_LP_T0" is defined as an area ID for uniquely identifying the Contents Area 421 included in the template part in FIG. 2(c) in the "id" attribute of a "TD" element 521. In this case, a character string following the second "_" is "T0". This indicates that number 0 is assigned to a title area.

Moreover, "HPB_LP_P0", "HPB_LP_P1", "HPB_LP_P2", and "HPB_LP_P3" are defined as respective area IDs for uniquely identifying the Contents Areas 422a, 422b, 422c, and 422d included in the template part in FIG. 2(c) in the "id" attribute of "TD" elements 522a, 522b, 522c, and 522d. In this case, character strings following the second "_" are "P0", "P1", "P2", and "P3". This indicates that numbers 0, 1, 2, and 3 are sequentially assigned to four picture areas.

Moreover, "HPB_LP_C0", "HPB_LP_C1", "HPB_LP_C2", and "HPB_LP_C3" are defined as respective area IDs for uniquely identifying the Contents Areas 423a, 423b, 423c, and 423d included in the template part in FIG. 2(c) in the "id" attribute of "TD" elements 523a, 523b, 523c, and 523d. In this case, character strings following the second "_" are "C0", "C1", "C2", and "C3". This indicates that numbers 0, 1, 2, and 3 are sequentially assigned to four caption areas.

A template part is inserted in an edit area on the basis of such definition information, and the user embeds, for example, texts and images in the edit area. A template part in which, for example, texts and images are embedded and definition information corresponding to the template part will now be described.

FIG. 11(a) shows the state of the template part shown in FIG. 2(b), in which "Picture of Dolphin" is input in the title area, a picture of a dolphin is put in the picture area, and "This a dolphin." is input in the caption area.

FIG. 11(b) shows exemplary definition information corresponding to the template part, in which a text, an image, and the like are embedded in this manner.

Comparison with the definition information in FIG. 9 corresponding to FIG. 2(b) shows that a text "Picture Title" in the "TD" element 511 is replaced with a text "Picture of Dolphin". Moreover, the value of the "src" attribute of an "IMG" element of the "TD" element 512 is set to "ani0002.jpg" (The file name of a picture of a dolphin). Moreover, a text "Picture Caption" in the "TD" element 513 is replaced with a text "This is a dolphin."

When content embedded in the current part is embedded in a selected part, the current part obtaining unit 31 obtains the definition information of the current part, i.e., an HTML document, and transfers the definition information to the merge unit 33. At the same time, the part ID of the current part is extracted and transferred to the filtering parameter generating unit 23, as described above. On the other hand, when the user has selected a desired template part from candidates for a template part, as described above, the selected part obtaining unit 32 obtains the definition information of the selected part, i.e., an HTML document, and transfers the definition information to the merge unit 33. At the same time, the management information is also transferred to the merge unit 33.

This starts the operation of the merge unit 33. When a title area, a caption area, and a picture area are considered as Contents Areas included in a template part, the merge unit 33 performs merge processing for each type of Contents Area. In this case, the flow of merge processing is the same for any type of Contents Area. Thus, assuming that the type of Contents Area is specified in a main routine, the operation of the merge unit 33, invoked by the main routine, related to the specified type of Contents Area will be described.

Figure 12:
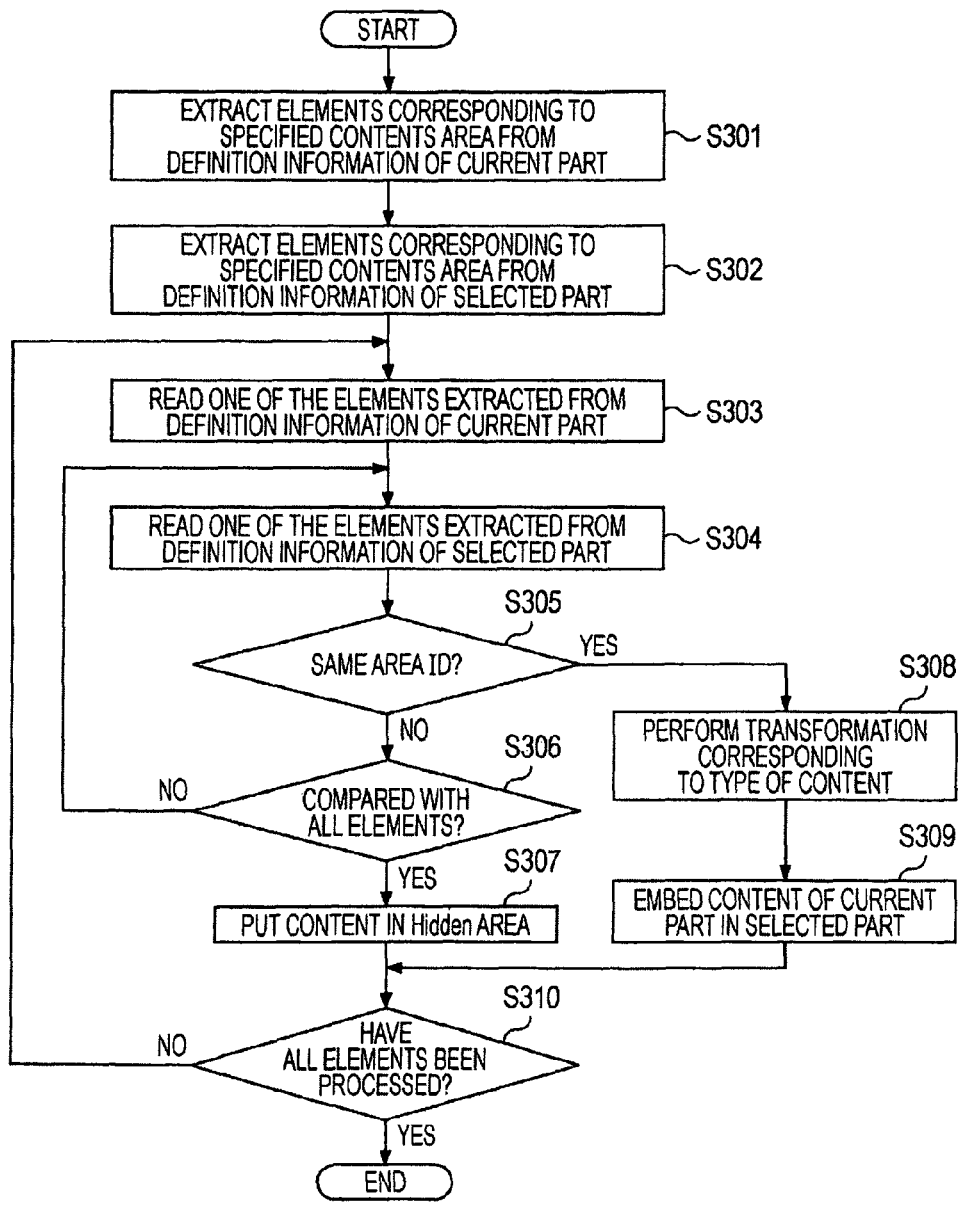
FIG. 12 is a flowchart showing an exemplary operation of a merge unit in the page editing unit according to the embodiment of the present invention.

FIG. 12 is a flowchart showing an exemplary operation of the merge unit 33.

The merge unit 33 first extracts elements that describe a specified Contents Area from the definition information (refer to FIG. 11(b)) of the current part in which, for example, texts and images are embedded (step 301). For example, when a title area is specified, elements in each of which a character following the second "_" in the value of the id attribute is "T" are extracted from the "TD" elements. When a caption area is specified, elements in each of which a character following the second "_" in the value of the "id" attribute is "C" are extracted from the "TD" elements. When a picture area is specified, elements in each of which a character following the second "_" in the value of the "id" attribute is "P" are extracted from the "TD" elements.

In this case, another template part may be embedded in, for example, a caption area in the current part in the editing process by the user. In such a case, it is preferable that the other template part embedded in the caption area be inherited by a selected part as is. Thus, in step 301, break process during the traversal search is performed. Break process during the traversal search is processing in which, when an element that describes a specified Contents Area has been found, the search of elements subordinate to the element in the tree structure is stopped.

Then, the merge unit 33 extracts elements that describe the specified Contents Area from the definition information (refer to FIGS. 8 to 10) of a selected part (step 302). The specific extracting method is similar to that described regarding step 301.

Then, the merge unit 33 focuses on a first element out of the elements extracted in step 301 and reads the first element (step 303). Then, the merge unit 33 sequentially compares the first element with the elements extracted in step 302.

Specifically, the merge unit 33 focuses on a second element out of the elements extracted in step 302 and reads the second element (step 304). Then, an area ID defined as the "id" attribute in the first element read in step 303 is compared with an area ID defined as the "id" attribute in the second element read in step 304 (step 305).

As a result, when the area IDs are not the same, the merge unit 33 determines whether the first element has been compared with all the elements extracted in step 302 (step 306). When the first element has not been compared with all the elements, the process returns to step 304 to compare the first element with the next element. When the first element has been compared with all the elements, since any Contents Area in which content embedded in the Contents Area defined in the focused first element is to be embedded does not exist, the content is stored in a Hidden area (step 307). A Hidden area is an item of an HTML form that does not appear on a screen and is used to transfer data. That is to say, in the present embodiment, a Hidden area is an exemplary area in which no template part is displayed. However, when any place in which content can be embedded does not exist, the content need not necessarily be put in such an area, and content for which any place for embedding the content does not exist may be deleted.

Then, the merge unit 33 determines whether the process has been performed for all the elements extracted in step 301 (step 310).

On the other hand, when the area IDs are the same in step 305, the merge unit 33 performs transformation corresponding to the type of content (step 308). Transformation corresponding to the type of content is a process in which, for example, in the case of images, content embedded in the current part is inherited to the characteristics of content embedded in a selected part by performing calculation of the aspect ratio and the like. Moreover, transformation based on the style attribute of content can be considered as transformation applicable to not only images but also texts. In general, it can be said to be transformation based on the property of content.

Then, the merge unit 33 embeds, in the Contents Area in the selected part, which is determined as being the same in step 305, the content embedded in the Contents Area defined in the focused first element in the current part (step 309).

Then, the merge unit 33 determines whether the process has been performed for all the elements extracted in step 301 (step 310).

When the process has been performed for all the elements, the process of the merge unit 33 is completed. When the process has not been performed for all the elements, the merge unit 33 returns to step 303 to perform similar processing of the next element.

In the exemplary operation in FIG. 12, it is determined in step 305 whether the area IDs are completely the same. However, it may not be determined whether the area IDs are completely the same. Specifically, not only an area ID that is completely the same as an area ID on one side but also another area ID that is predetermined may be considered as being the same. For example, a case where the current part includes only a single title area, and a selected part includes a plurality of title areas is considered. In this case, a copy mode in which content embedded in a Contents Area is copied to a plurality of Contents Areas can be implemented by making determination so that the area ID of the single title area in the current part is the same as the area IDs of the plurality of title areas in the selected part.

A template part in which content is embedded in the copy mode will now be shown.

FIG. 13(a) shows a specific example of such a template part. Such embedding of content in a template part can be performed by specifying the copy mode, for example, when the template part in FIG. 2(b) is changed to the template part in FIG. 2(c) with an option of growth. In this case, the copy mode is specified for a caption area and a picture area.

FIG. 13(b) shows definition information corresponding to this template part.

In this way, in the present embodiment, when a template part in which content is embedded is changed to a new template part, the state of embedding of content is automatically determined in response to the attributes of areas in the template part. In this arrangement, an operation to change a template part that is initially inserted with options of growth, degeneration, variation, and mutation and embed content can be efficiently performed. Thus, time spent for the editing operation by the user can be reduced.

Moreover, in the present embodiment, when a template part in which content is embedded is changed to a new template part, candidates, corresponding to a change rule, for a template part are presented. In this arrangement, the operability at the time of changing a template part can be improved.

Figure 14:
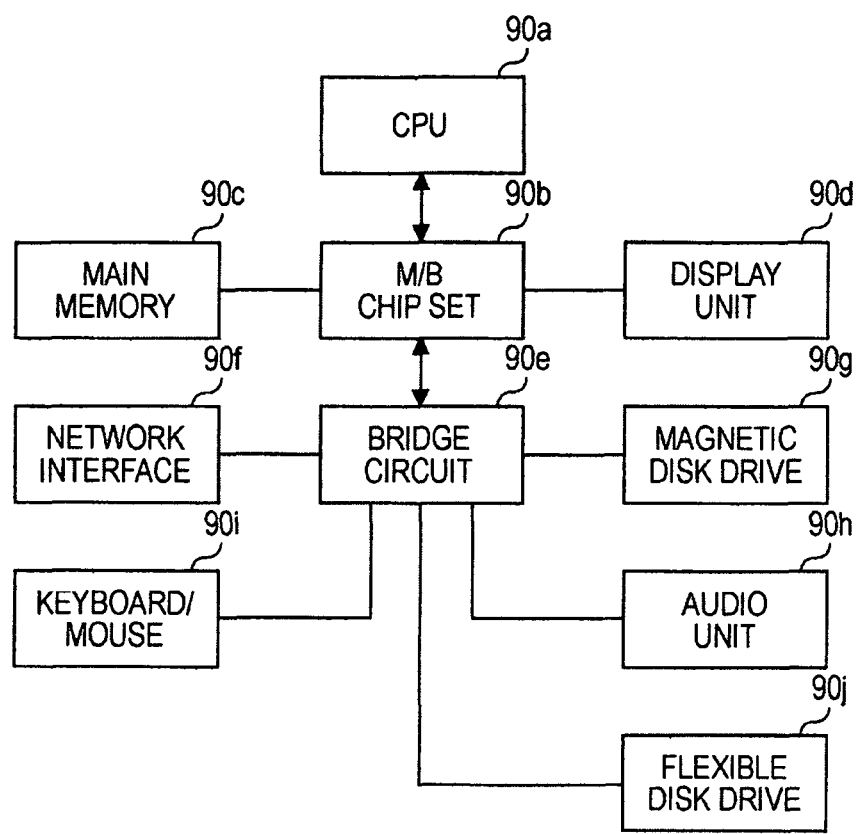
FIG. 14 shows the hardware configuration of a computer to which the embodiment of the present invention is applicable.

Finally, the hardware configuration of a computer suitably applicable to the present embodiment will be described. FIG. 14 shows an example of the hardware configuration of such a computer. The computer includes a central processing unit (CPU) 90a that is calculation means, a main memory 90c connected to the CPU 90a via a mother board (M/B) chip set 90b, and a display unit 90d connected to the CPU 90a via the M/B chip set 90b, as shown in the drawing. Moreover, a network interface 90f, a magnetic disk drive (HDD) 90g, an audio unit 90h, a keyboard/mouse 90i, and a flexible disk drive 90j are connected to the M/B chip set 90b via a bridge circuit 90e.

In FIG. 14, the individual components are connected to each other via a bus. For example, connection between the CPU 90a and the M/B chip set 90b and connection between the M/B chip set 90b and the main memory 90c are established via a CPU bus. Moreover, connection between the M/B chip set 90b and the display unit 90d may be established via Accelerated Graphics Port (AGP). However, when the display unit 90d includes a video card that supports PCI Express, connection between the M/B chip set 90b and this video card is established via a PCI Express (PCIe) bus. Moreover, when connection to the bridge circuit 90e is established, regarding the network interface 90f, for example, PCI Express may be used. Moreover, regarding the magnetic disk drive 90g, for example, serial AT Attachment (ATA), ATA for parallel transfer, or Peripheral Components Interconnect (PCI) may be used. Moreover, regarding the keyboard/mouse 90i and the flexible disk drive 90j, Universal Serial Bus (USB) may be used.

The apparatus and method may be implemented entirely via hardware, or entirely via software. Moreover, the apparatus and method may be implemented via both hardware and software. Moreover, the apparatus and method may be implemented as a computer, a data processing system, or a computer program. This computer program can be stored in a computer-readable medium and provided. In this case, an electronic, magnetic, optical, electromagnetic, infrared, or semiconductor system (apparatus or device), or a transmission medium may be considered as the medium. Moreover, a semiconductor or solid-state storage unit, a magnetic tape, a detachable computer diskette, a random access memory (RAM), a read only memory (ROM), a rigid magnetic disk, and an optical disk can be shown as an example of a computer-readable medium. Examples of current optical disks include a compact disk-read only memory (CD-ROM), a compact disk-read/write (CD-R/W), and a DVD.

While the apparatus and method been described using the embodiment, the technical scope of the present invention is not limited to the embodiment. It is obvious to persons skilled in the art that various changes can be made or an alternative embodiment can be adopted without departing from the spirit and scope of the present invention.

* IBM, WebSphere, WebSphere Business Monitor, WebSphere Integration Developer and WebSphere Process Server are registered trademarks of International Business Machines Corporation in the United States, other countries, or both.

We claim:

1. An apparatus comprising:
   a storage unit that stores a plurality of electronic templates such that each electronic template includes contents areas in which content elements that constitute an electronic document are to be embedded to create the electronic document; and
   a hardware processing unit including:
      a first control unit that controls a display unit that displays a first electronic template selected from the plurality of electronic templates stored in the storage unit;
      an extracting unit that extracts one or more electronic templates satisfying a user-selected rule as one or more candidates for a second electronic template, wherein the user-selected rule indicates a quantity of contents areas for the second electronic template relative to a quantity of contents areas for the first electronic template and the extracting unit compares the quantity of contents areas of the first electronic template to the quantity of contents areas of the electronic templates to determine the one or more candidates with quantities of contents areas satisfying the user-selected rule;
      a second control unit that controls the display unit so as to display the one or more candidates for selection of the second electronic template;
      a reception unit that accepts an operation to transfer content from the first electronic template including contents areas in which specific content elements are embedded to the second electronic template selected from the one or more candidates;
      a determining unit that, in response to the operation accepted by the reception unit, determines a state of embedding by comparing attributes of the contents areas in the first electronic template to attributes of contents areas in the second electronic template to determine contents areas in the second electronic template to receive the embedded specific content elements from the first electronic template, and embeds the specific content elements embedded in the first electronic template in the determined contents areas of the second electronic template; and
      a third control unit that controls the display unit to display the second electronic template on the basis of the state of embedding determined by the determining unit.

2. The apparatus of claim 1, wherein the second electronic template includes more contents areas having a specific attribute than the first electronic template and the determining unit determines contents areas in the second electronic template on the basis of the state of embedding, the specific content elements being embedded in the contents areas.

3. The apparatus of claim 2, wherein the extracting unit extracts, as candidates for the second electronic template, electronic templates that meet a condition that the electronic templates include more contents areas having the specific attribute than the first electronic template.

4. The apparatus of claim 3, wherein the extracting unit extracts, as candidates for the second electronic template, electronic templates that further meet a condition related to at least one of a state of embedding of the specific content elements in the first electronic template and a state of display of the first electronic template by the display unit.

5. The apparatus of claim 2, wherein the third control unit controls the display unit to display the second electronic template in a state in which new content elements obtained by performing transformation of the specific content elements to fit into contents areas determined by the determining unit are embedded in the contents areas.

6. The apparatus of claim 2, wherein the third control unit controls the display unit to display the second electronic template in a state in which one of the specific content elements embedded in a contents area in the first electronic template is embedded in a plurality of contents areas determined by the determining unit.

7. The apparatus of claim 1, wherein the second electronic template includes fewer contents areas having a specific attribute than the first electronic template and the determining unit determines whether to embed the specific content elements in the second electronic template on the basis of the state of embedding.

8. The apparatus of claim 7, wherein the extracting unit extracts, as candidates for the second electronic template, electronic templates that meet a condition that the electronic templates include fewer contents areas having the specific attribute than the first electronic template.

9. The apparatus of claim 7, wherein the third control unit controls the display unit so as to display the second electronic template in a state in which the specific content elements are embedded in areas in the second electronic template that are not displayed.

10. A method comprising:
    displaying a first electronic template selected from a plurality of electronic templates that each include contents areas in which content elements that constitute an electronic document are to be embedded to create the electronic document;
    extracting one or more electronic templates satisfying a user-selected rule as one or more candidates for a second electronic template, wherein the user-selected rule indicates a quantity of contents areas for the second electronic template relative to a quantity of contents areas for the first electronic template, and wherein the extracting further comprises:
       comparing the quantity of contents areas of the first electronic template to the quantity of contents areas of the electronic templates to determine the one or more candidates with quantities of contents areas satisfying the user-selected rule;
    controlling the displaying so as to display the one or more candidates for selection of the second electronic template;
    accepting an operation to transfer content from the first electronic template including contents areas in which specific content elements are embedded to the second electronic template selected out of the one or more candidates;
    determining, in response to the operation, a state of embedding by comparing attributes of the contents areas in the first electronic template to attributes of contents areas in the second electronic template to determine contents areas in the second electronic template to receive the embedded specific content elements from the first electronic template, and embedding the specific content elements embedded in the first electronic template in the determined contents areas of the second electronic template; and displaying the second electronic template on the basis of the determined state of embedding.

11. The method of claim 10, wherein the second electronic template includes more contents areas having a specific attribute than the first electronic template and a determination of contents areas in the second electronic template is performed on the basis of the state of embedding, the specific content elements being embedded in the contents areas.

12. The method of claim 11, wherein the extracting further comprises:
   extracting, as candidates for the second electronic template, electronic templates that meet a condition that the electronic templates include more contents areas having the specific attribute than the first electronic template.

13. The method of claim 12, wherein the extracting, as candidates for the second electronic template, electronic templates includes a further condition related to at least one of a state of embedding of the specific content elements in the first electronic template and a state of display of the first electronic template.

14. The method of claim 11, further comprising controlling the display of the second electronic template in a state in which new content elements obtained by performing transformation of the specific content elements to fit into contents areas determined as being embedded in the contents areas.

15. The method of claim 11, further comprising controlling the display of the second electronic template in a state in which one of the specific content elements embedded in a contents area in the first electronic template is embedded in a plurality of contents areas.

16. The method of claim 10, wherein the second electronic template includes fewer contents areas having a specific attribute than the first electronic template and a determination is performed to determine whether to embed the specific content elements in the second electronic template on the basis of the state of embedding.

17. The method of claim 16, wherein the extracting further comprises:
   extracting, as candidates for the second electronic template, electronic templates that meet a condition that the electronic templates include fewer contents areas having the specific attribute than the first electronic template.

18. The method of claim 16, wherein the second electronic template is displayed in a state in which the specific content elements are embedded in areas in the second electronic template that are not displayed.

19. A computer program product comprising a computer useable memory device having a computer readable program, wherein the computer readable program when executed on a computer causes the computer to:
   display a first electronic template selected from a plurality of electronic templates that each include contents areas in which content elements that constitute an electronic document are to be embedded to create the electronic document;
   extract one or more electronic templates satisfying a user-selected rule as one or more candidates for a second electronic template, wherein the user-selected rule indicates a quantity of contents areas for the second electronic template relative to a quantity of contents areas for the first electronic template, and the extracting further comprises:
      comparing the quantity of contents areas of the first electronic template to the quantity of contents areas of the electronic templates to determine the one or more candidates with quantities of contents areas satisfying the user-selected rule;
   control the displaying so as to display the one or more candidates for selection of the second electronic template;
   accept an operation to transfer content from the first electronic template including contents areas in which specific content elements are embedded to the second electronic template selected out of the one or more candidates;
   determine, in response to the operation, a state of embedding by comparing attributes of the contents areas in the first electronic template to attributes of contents areas in the second electronic template to determine contents areas in the second electronic template to receive the embedded specific content elements from the first electronic template, and embed the specific content elements embedded in the first electronic template in the determined contents areas of the second electronic template; and
   display the second electronic template on the basis of the determined state of embedding.

20. The computer program product of claim 19, wherein the second electronic template includes more contents areas having a specific attribute than the first electronic template and a determination of contents areas in the second electronic template is performed on the basis of the state of embedding, the specific content elements being embedded in the contents areas.

21. The computer program product of claim 20, wherein the computer is further caused to:
   extract, as candidates for the second electronic template, electronic templates that meet a condition that the electronic templates include more contents areas having the specific attribute than the first electronic template.

22. The computer program product of claim 21, wherein the extracting, as candidates for the second electronic template, electronic templates includes a further condition related to at least one of a state of embedding of the specific content elements in the first electronic template and a state of display of the first electronic template.

23. The computer program product of claim 20, wherein the computer is further caused to control the display of the second electronic template in a state in which new content elements obtained by performing transformation of the specific content elements to fit into contents areas determined as being embedded in the contents areas.

24. The computer program product of claim 20, wherein the computer is further caused to control the display of the second electronic template in a state in which one of the specific content elements embedded in a contents area in the first electronic template is embedded in a plurality of contents areas.

25. The computer program product of claim 19, wherein the second electronic template includes fewer contents areas having a specific attribute than the first electronic template and a determination is performed to determine whether to embed the specific content elements in the second electronic template on the basis of the state of embedding.

26. The computer program product of claim 25, wherein the computer is further caused to:
   extract, as candidates for the second electronic template, electronic templates that meet a condition that the electronic templates include fewer contents areas having the specific attribute than the first electronic template.

27. The computer program product of claim 25, wherein the second electronic template is displayed in a state in which the specific content elements are embedded in areas in the second electronic template that are not displayed.

* * * * *